Patented Nov. 11, 1924.

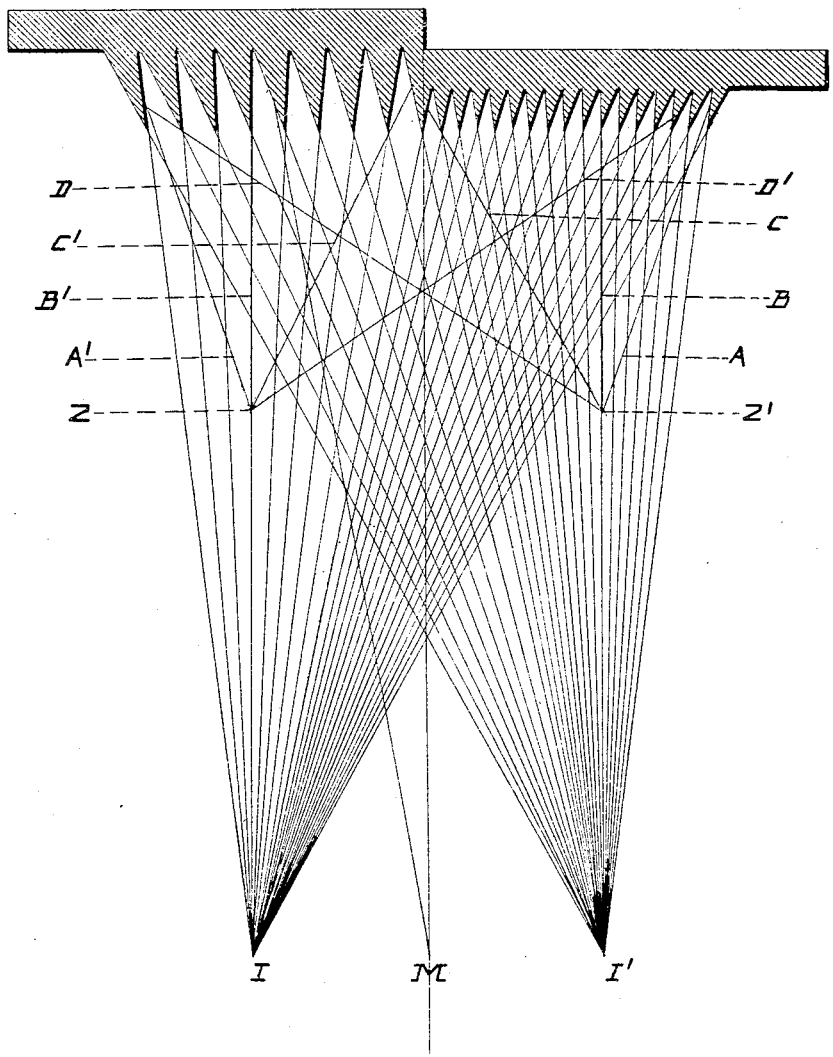

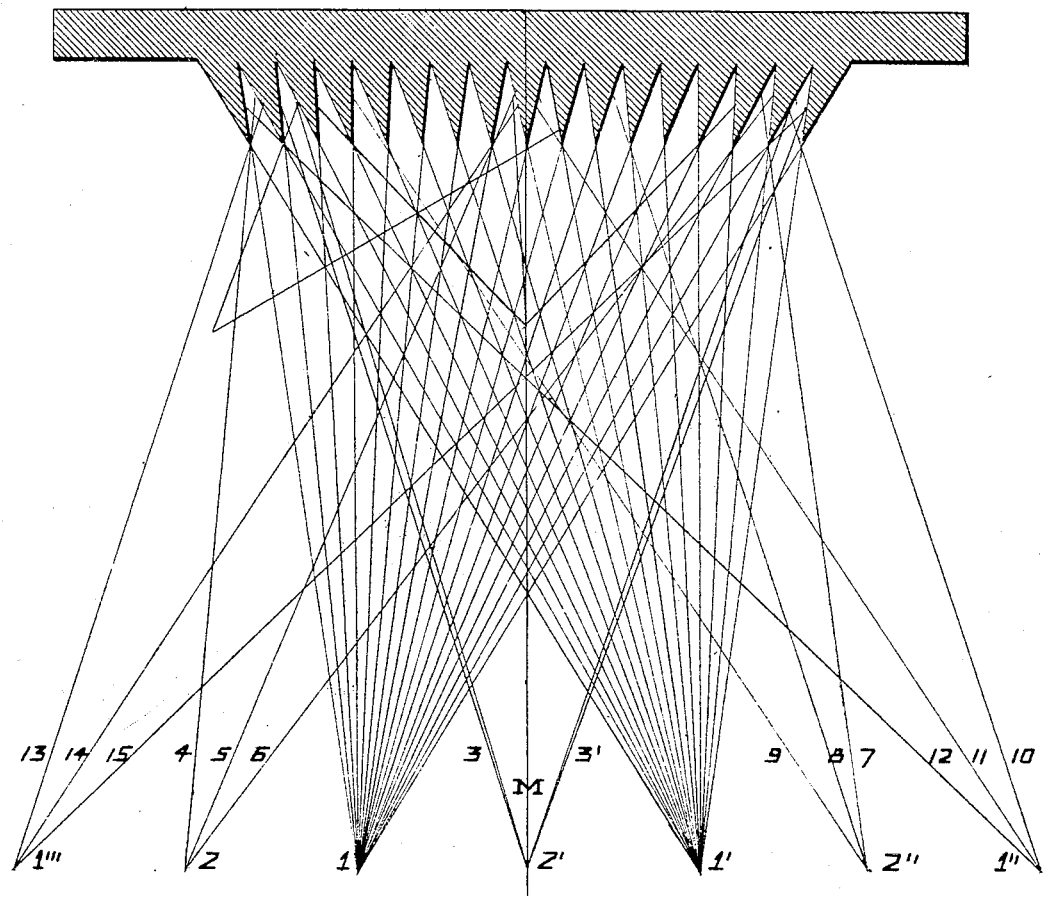

1,515,427

UNITED STATES PATENT OFFICE.

CHARLES BOUIN, OF BOSTON, MASSACHUSETTS.

STEREOSCOPIC PROJECTION SCREEN.

Application filed January 26, 1922. Serial No. 531,937.

*To all whom it may concern:*

Be it known that I, CHARLES BOUIN, a citizen of the United States, residing at Boston, in the county of Suffolk and State of Massachusetts, have invented certain new and useful Improvements in Stereoscopic Projection Screens, of which the following is a specification.

This invention involves the art of construction of a projection screen of certain specified qualification and with certain means of projection of stereoscopic images upon such a screen, constitutes an improvement.

The invention relates more particularly to a stereoscopic projection screen, or, a screen upon which are projected a pair or series of pairs of stereoscopic pictures from certain angle directions, and in viewing the projected pictures upon such a screen as to be described; relief, solidity, or the third dimension will be perceived.

Further object and advantages of the present invention will be pointed out in the hereinafter following description of one embodiment hereof, or will be obvious to those skilled in the mentioned arts.

Fig. 4, is intended to represent a method whereby different sizes of triangular shaped bodies or projections of screen are calculated. Such projections or bodies of screen being made of any degree of fineness desired; the triangular bodies on right side of screen being smaller than the left side simply for the purpose of comparison and illustration.

Fig. 5, is intended to represent the different portions of screen that are seen with the two eyes at different positions.

Figure 1:
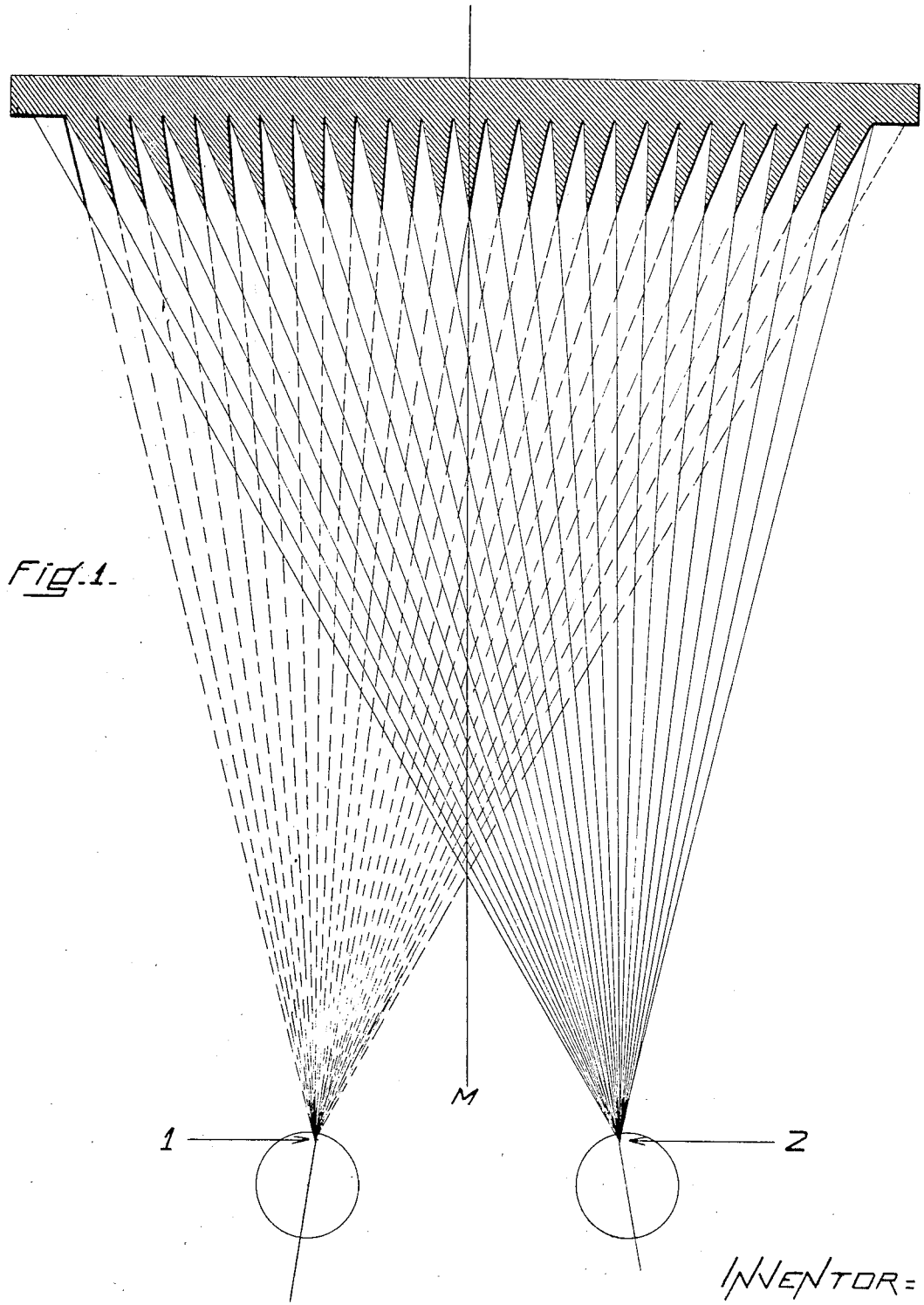
Fig. 1, is intended to represent a cross-sectional view of a stereoscopic projection screen in relation to the two eyes in a certain position and distance.

Referring to Fig. 1, the cross section of different triangular shaped bodies represents the projection screen which may be made of any suitable material desired, 1, represents the position of the left eye, 2, represents the position of right eye, and the line M represents the median line. With the position of screen and eyes as in Fig. 1, only the right side of triangular bodies will be observed by the right eye and only the left side of bodies will be observed by the left eye. If a right angle picture is projected upon screen from point 2, and a left angle picture projected from point 1, the right eye would only see the right angle picture and the left eye would only see the left angle picture thus meeting the requirements for perception of relief, space etc. The uninterrupted lines from point 2, to screen represents the direction of light rays of projected image from point 2 to screen; such direction of lines from screen to point 2, would represent the direction of light rays from screen to right eye. The interrupted lines from point 1, to screen represents the direction of light rays of projected image from point 1, to screen; such direction of lines from screen to point 1, would represent the direction of light rays from screen to left eye.

Figure 2:
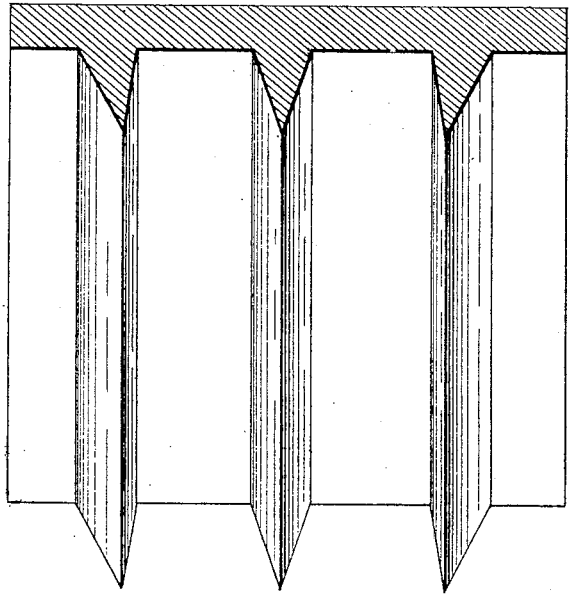
Fig. 2, is intended to represent a front view of a projection screen with vertically elongated triangular shaped bodies running in the vertical direction of screen.

Referring to Fig. 2, which represents a front and cross sectional view of projection screen; the projections or bodies of the screen run in the whole vertical length of screen, being separated and exaggerated for the purpose of being more easily understood. These elongated triangular shaped bodies of screen vary in shape from equilateral or isosceles triangles in centre of screen and gradually change in shape on approaching the horizontal margins of screen to right or left angle triangles according to horizontal side of centre, and so on to obtuse-angled triangles, which are more pronounced as horizontal margins of screen are reached. In other words, the triangular shaped bodies or projections of the stereoscopic screen are of such triangular shape that corresponds to the crossing of two lines from two points of about 2½ inches apart, or corresponding to the normal distance of the two eyes in relation to each other, or crossing of the optic axes. The triangular shaped bodies or projections of screen being of such shapes that correspond to triangular shapes which are made by two lines crossing which are not more than 2½ inches apart from the two points, as points 1 and 2 in Fig. 1.

The distance of the two points 1 and 2, are of such a distance from the screen to correspond to a distance which is as great or greater than the distance from which images projected upon such a screen are to be viewed from; again, the distance of these two points, 1 and 2, the lines from which form the triangular shaped bodies from which triangular shapes are made, are of such a distance from the screen that such a distance corresponds to a distance which is as great or greater than the distance from which the images are projected upon such a screen.

When a right and left angle image (stereoscopic pair) are properly projected upon such a screen as has been described, if the right eye is on the right side of the median line M and the left eye on the left side of median line M, the two eyes being horizontal to the median or vertical line M, such horizontal relation of the eyes to the vertical direction, at any vertical height when viewing such images projected upon such a screen, images of scenes or objects will produce true binocular or stereoscopic perception of relief, solidity, space etc., each eye will see only the image properly belonging to it, or in a degree sufficiently so practically.

Figure 3:
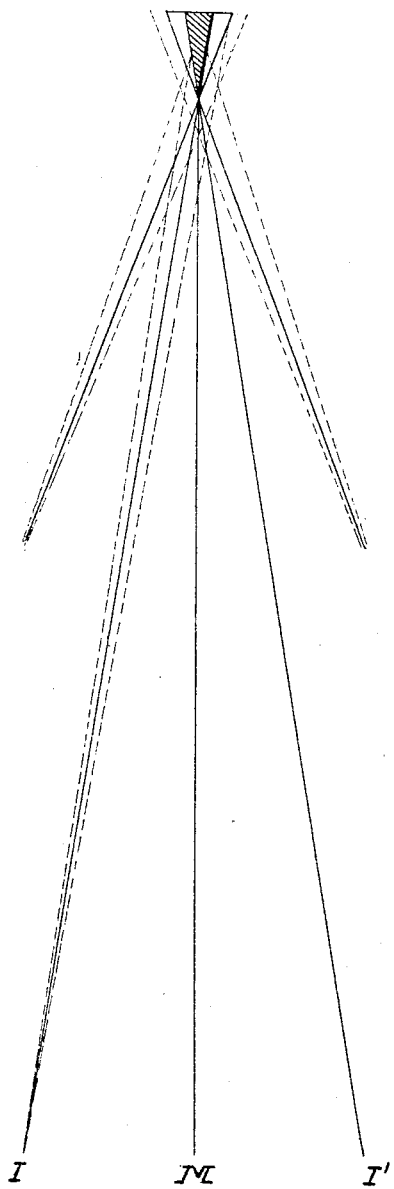
Fig. 3, is intended to represent the effect of looking at a triangle from two different distances.

Referring to Fig. 3, it will be observed that when a triangular shape is formed by the crossing of two lines such as the two uninterrupted lines, one each from points 1 and 1', the viewing of such a shaped triangular body from any point nearer than points 1 and 1' will result in the right eye seeing only the right side and the left eye seeing only the left side, of such a triangular shaped body, as indicated in Fig. 1, by the interrupted lines which are nearer the triangular shape than those from point 1; when a triangular shape is formed by the crossing of two lines such as the two uninterrupted lines from the two points which are much nearer than points 1 and 1', the viewing of such a shaped triangular body from any point more distant than the points from which such triangular bodies are made, will result in the right eye seeing both sides and also the left eye seeing both sides of such a triangular shaped body, as indicated in Fig. 1, by the interrupted lines running from point 1 to triangle.

The above explanation should be sufficient to understand the importance of constructing the triangular bodies in such shape or form as to correspond to distances which are greater than the distance of viewing of images on the triangular shaped bodies of screen.

Referring to Fig. 4, which represents a cross section of a projection screen, the triangular bodies or projections on right side of screen being smaller than on the left side and is here shown as such for the purpose of showing how the depth and width of triangular bodies may be reduced to any degree of fineness desired.

Of a stereoscopic screen constructed as has already been explained, the following is to be noted.

1. If the distance of projection and the distance of viewing projected images upon such a screen are equal or nearly so, each eye will see only the image properly belonging to it.

2. If the distance of viewing the projected images upon such a screen is much nearer the screen than the distance which these triangular shaped bodies represent, such as 1 and 1', and the position of the two eyes in relation to the median line M is maintained, as Z and Z' in Fig. 4, the right eye will have a tendency to see part of the left angle image at the right margins of screen as indicated by line A, and decreasing until point as indicated by line B is reached, at which point only the right angle image is seen by the right eye, from this point on to the margins of left side of screen, the right eye sees only the right angle image but the amount of image seen decreases as indicated by lines C and D. The left eye will have a tendency to see part of the right angle image at the left margins of screen as indicated by the lines in Fig. 1, and decreasing until point as indicated by line B' is reached, at which point only the left angle image is seen by the left eye, from this point to the margins of right side of screen, the left eye sees only the left angle image but the amount of image seen decreases as indicated by lines C' and D'.

3. Referring to Fig. 5, if the distance of projection and the distance of viewing projected images upon the screen are equal or nearly so, and maintaining the horizontal position of the eyes in relation to the projection screen, changing the position of the eyes from 1 and 1' to 2 and 2' or to a point where the right eye reaches the median line M, the right eye will see both the right and left angle image projected upon the screen, as indicated by double lines 3 and 3'; the left eye will see only the left angle image, the amount of left image seen by left eye gradually decreasing from left margin of screen to right margin, as indicated by lines 4, 5, and 6 in Fig. 5.

4. Changing the position of the eyes to 2' and 2'' or to a point where the left eye reaches the median line M, the left eye will see both the left and right angle image projected upon the screen, as indicated by the double lines 3 and 3', in Fig. 5; the right eye will see only the right angle image, the amount of right image seen by right eye gradually decreasing from right margin of screen to left margin, as indicated by lines 7, 8, and 9, in Fig. 5.

5. Changing the position of the eyes to 1' and 1'' or to a point where the both eyes are to the right of median line M, both eyes will see only the right angle image; the left eye will see all of the right angle image while the right eye will see a decreased amount of the right angle image, as indicated by lines 10, 11, and 12 in Fig. 5. The left angle image not being seen by either eye.

6. Changing the position of the eyes to 1 and 1''' or to a point where both eyes are to the left of the median line M, both eyes will see only the left angle image, the right eye will see all of the left angle image while the left eye will see a decreased amount of the left angle image, as indicated by lines 13, 14, and 15 in Fig. 5. The right angle image not being seen by either eye.

I do not confine myself to the particular style of projection screen here shown, but various other changes and modifications, within the skill of those versed in the mentioned arts may be made in such a projection screen as has been shown and described herein without departing from the spirit of my invention provided the principle set forth in the following claims be employed.

Having thus described my invention, I claim:—

1. A stereoscopic projection screen comprising a flat base adapted to be placed in a substantially vertical position, and a plurality of spaced-apart triangularly-shaped bodies arranged vertically upon the base and gradually changing in shape from isosceles triangles at the center to obtuse angled triangles oppositely inclined and of constantly increasing inclinations on opposite sides of the center of the screen.

2. A stereoscopic projection screen comprising a flat base adapted to receive thereon projected pictures from a stereoscopic pair, and a plurality of vertically extending bodies of triangular shape arranged in horizontally-spaced relation across the face of the base, said bodies having their opposite sides converging in planes which intersect at the apices of the bodies and which radiate from points of vision spaced a binocular distance apart, said sides of the bodies varying in inclination relatively to the base proportionately to the distance said points of vision lie from said base.

This specification signed and witnessed this 19th day of January, 1922.

CHARLES BOUIN.

Witnesses:
MAY R. McEVOY,
MARGARET PEARODY.